United States Patent
Niida et al.

[11] Patent Number: 6,118,806
[45] Date of Patent: Sep. 12, 2000

[54] SIGNAL SYNTHESIS METHOD AND APPARATUS UNDER DIVERSITY RECEPTION

[75] Inventors: Sumaru Niida, Saitama; Toshinori Suzuki, Tokyo, both of Japan

[73] Assignee: KDD Corporation, Tokyo, Japan

[21] Appl. No.: 09/320,680

[22] Filed: May 27, 1999

[30] Foreign Application Priority Data

May 29, 1998 [JP] Japan .................................. 10-148927

[51] Int. Cl.$^7$ ............................ H04B 15/00; H04K 1/00; H04L 27/30
[52] U.S. Cl. ........................................... 375/148; 370/342
[58] Field of Search .................................. 375/148, 346, 375/347, 367; 370/320, 335, 342, 441

[56] References Cited

U.S. PATENT DOCUMENTS

| | | | |
|---|---|---|---|
| 5,297,171 | 3/1994 | Koch ........................................ | 375/347 |
| 5,646,964 | 7/1997 | Ushirokawa et al. .................. | 375/346 |
| 5,768,307 | 6/1998 | Schramm et al. ...................... | 375/208 |

OTHER PUBLICATIONS

"A Space–Path Hybrid Diversity Scheme for Base–Station Reception in CDMA Mobile Radio Communication System," Technical Report of IEICE, A P93–29, SAT93–12 (1993–05), The Institute of Electronics, Information and Communication Engineers.

*Primary Examiner*—Don N. Vo
*Assistant Examiner*—Phuong Phu

[57] ABSTRACT

An apparatus for combining signals includes RAKE receivers 10, 20, noise-power measuring apparatuses 30, 40, and a branch combiner 50. The RAKE receivers 10, 20 are the same in number as the antenna branches, and each RAKE receiver combines received signals by using a weight based on an amplitude of each received signal. Each of the noise-power measuring apparatus 30, 40 measures a sum of an interference power and a background-noise power in an output signal from each RAKE receiver. The branch combiner 50 multiplies the output signal from each RAKE receiver by an inverse of the sum measured by the noise-power measuring apparatus, and then adds up the value obtained by each multiplication.

2 Claims, 6 Drawing Sheets

SIGNAL SYNTHESIS METHOD AND APPARATUS UNDER DIVERSITY RECEPTION

FIELD OF THE INVENTION

This invention relates to a method and an apparatus, each of which is suitable for performing a diversity technique in a wireless communication system using a spread spectrum method.

BACKGROUND

A fluctuation of a received wave, based on a fading, is a great problem for stability of communication quality in the wireless communication system. There is a diversity technique which uses two or more received waves, as a counterplan against the fading.

As classified by a configuration of branches, there are known: space diversity, an angle diversity, a polarization diversity, a frequency diversity and a time diversity.

A RAKE combining (which is a kind of the time diversity technique), is usually utilized in the wireless communication system using the spread spectrum method.

An origin of the term "RAKE" is a "rake". A meaning of the term "RAKE" is to gather signals. The diversity technique, which performs a signal combining by gathering signals which have arrived at different times because of different delays based on a multipath, is generally called "RAKE".

The diversity technique maintains a good receiving condition, by combining two or more received waves which have no correlation to each other.

In the wireless communication, there are several paths such as a direct wave and a reflected wave, where propagation conditions are different each other. Therefore, even if a condition of one received wave becomes worse, it may be possible to receive another wave via another path in a good condition. Namely, a probability, by which a good detection condition can be kept, becomes greater by combining signals through different paths as opposed to a reception of only one signal.

Some reception methods, each of which combines several diversities were proposed for applying the diversity technique to the wireless mobile communication.

In the communication system using the spread spectrum, it has been considered to combine the RAKE receiver and another diversity technique. For example, it was proposed to use the space diversity technique together with the RAKE receiver.

Figure 4:
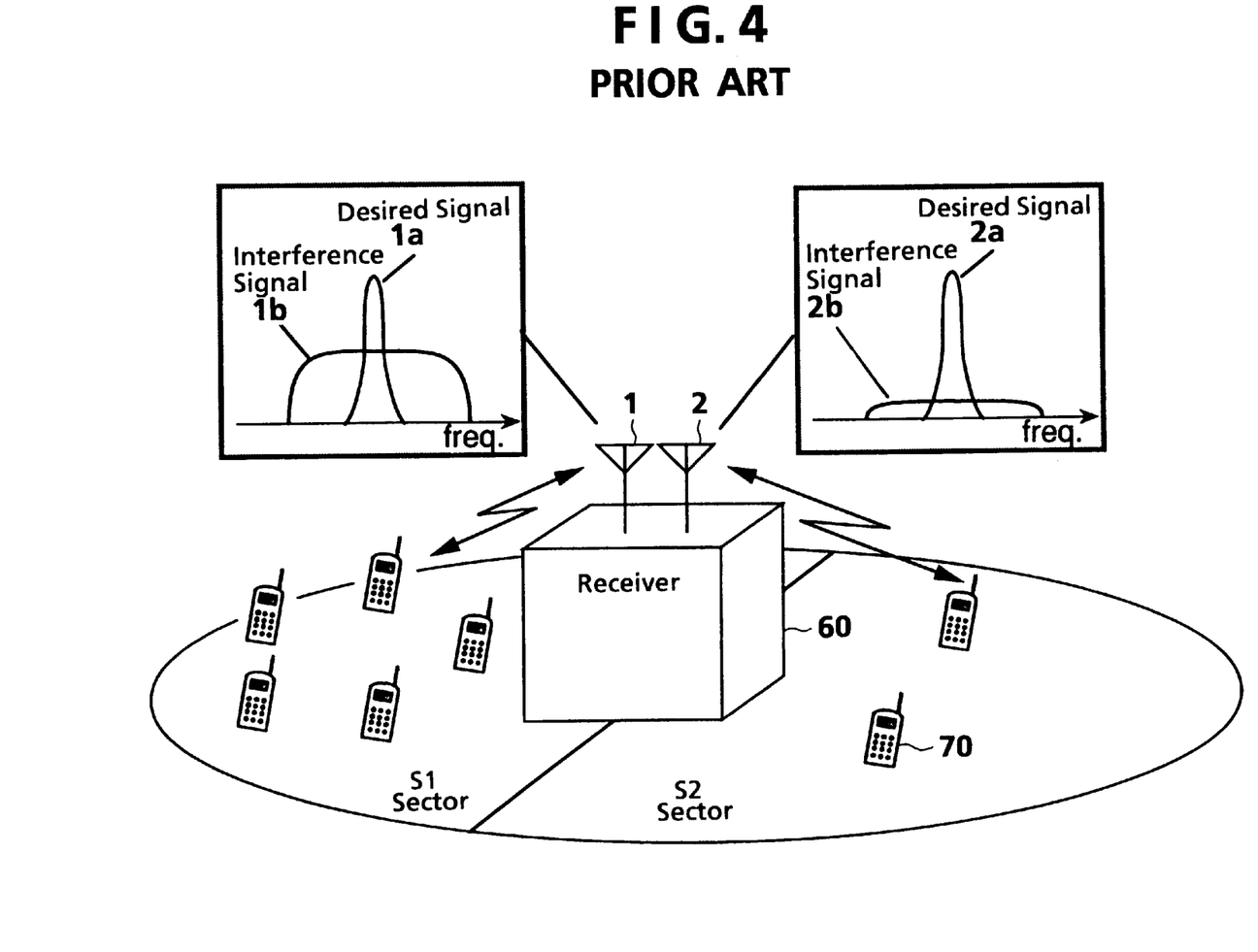
FIG. 4 shows a communication system using the sector antenna.

Referring to FIG. 4, the combination of the RAKE synthesis and the space diversity applied to the wireless communication system using sector antennas will be explained. In the example shown in FIG. 4, a base station 60 receives a signal from a mobile station 70 by using two antenna branches or an antenna 1 and an antenna 2. A receiver in the base station 60 combines received signals by using the combination of the RAKE receiver and an antenna diversity.

As shown in FIG. 4, a desired signal 1a and an interference signal 1b are included in a signal received by the antenna 1, and a desired signal 2a and an interference signal 2b are included in a signal received by the antenna 2.

A power of the interference signal, included in the signal received by the antenna branch, is approximately determined by the number of users within a sector. Therefore, when the number of users within the sector S1 is different from the number of users within the sector S2, the power of the interference signal 1a and the power of the interference signal 2a are different from each other.

Following (1), (2) are known as methods for combining received signals under the diversity detection.

(1) A signal combining in which the received signal is weighted by a value in proportion to its amplitude. An example of a circuit performing the signal combining (1) is shown in FIG. 5.

(2) A signal combining in which the received signal is weighted by a value in proportion to its signal to noise ratio (SN ratio). An example of a circuit performing the signal combining (2) is shown in FIG. 6.

Figure 5:
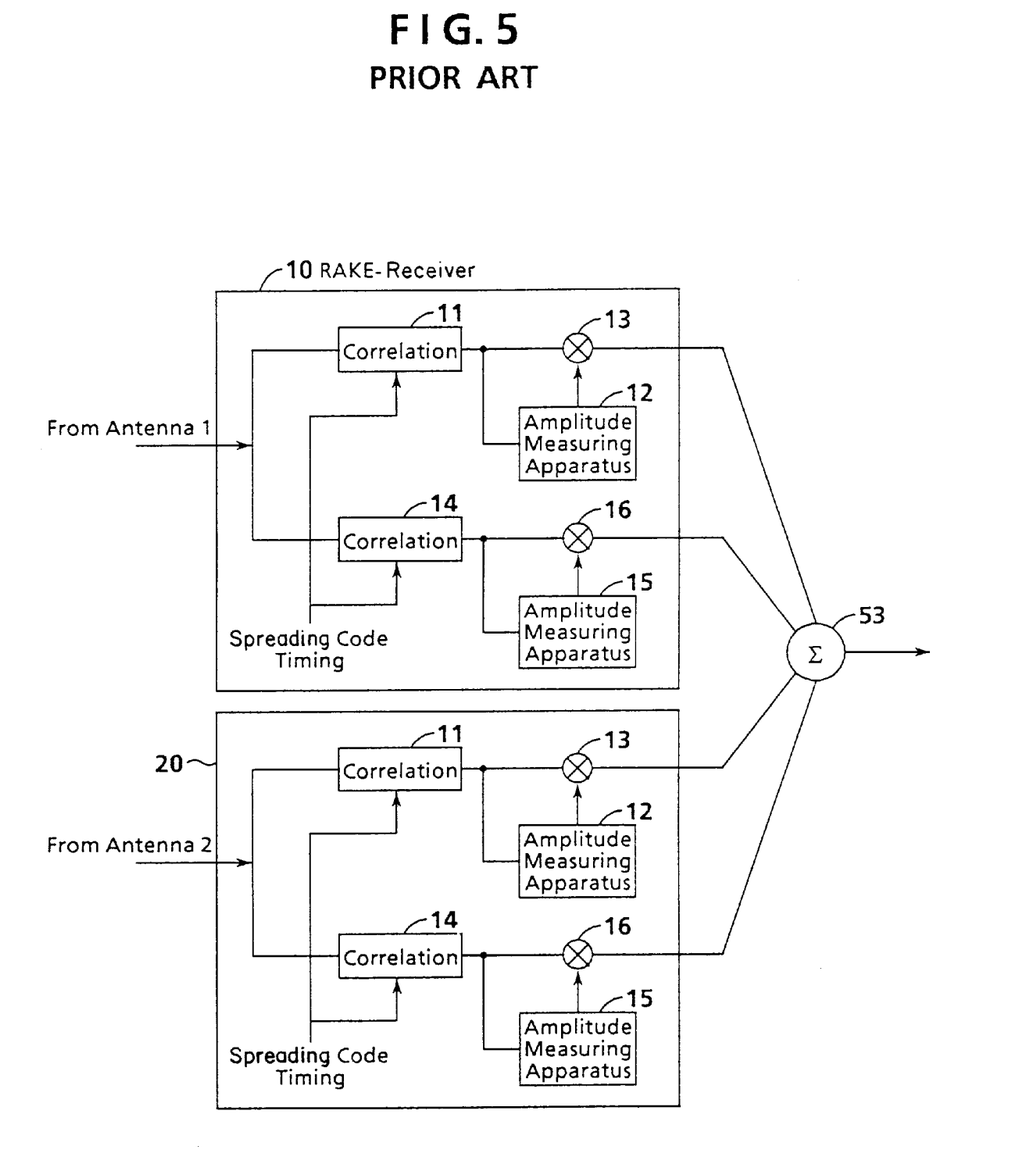
FIG. 5 shows a circuit which weights the received signal in proportion to its amplitude.
Figure 6:
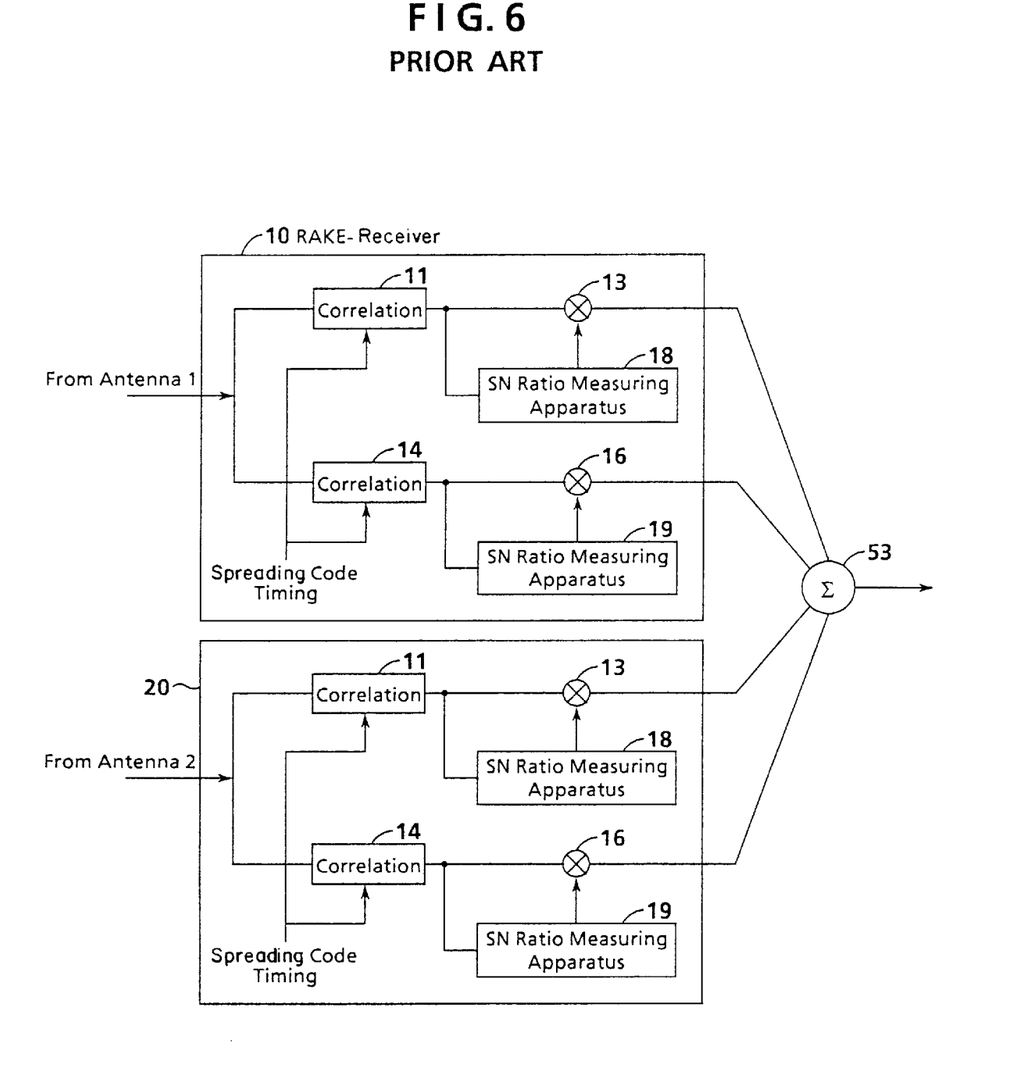
FIG. 6 shows a circuit which weights the received signal in proportion to its SN ratio.

In FIGS. 5 and 6, the number of fingers of each RAKE receiver is 2. Each RAKE receiver is connected with each antenna branch. The number of paths to be received is 2.

FIG. 5 shows a signal combining apparatus in which the received signal is weighted by a value in proportion to its amplitude. The apparatus comprises the RAKE receiver 10, the RAKE receiver 20 and the adding circuit 53. The received signal from the antenna 1 is input to the RAKE receiver 10. The received signal from the antenna 2 is input to the RAKE receiver 20. Each of the RAKE receivers 10, 20 comprises two correlation apparatuses (correlators) 11, 14, two amplitude measuring apparatuses 12, 15, and two integrating circuits 13, 16.

In the signal combining apparatus shown in FIG. 5, the signals from the antenna branches 1, 2 are converted to base-band signals the, and quantized by A/D converter, then converted to digital signals. These digital signals are input to the RAKE receiver 10, 20 respectively. In each of the RAKE receivers 10, 20, a despreading of the input signal is performed, by each of the correlators 11, 14, by using a signal sequence which is used for the spread spectrum. Each amplitude of output signals from the correlators 11, 14, is measured by each of the amplitude measuring apparatuses 12, 15. Each output signal from the correlators 11, 14 is weighted, in each of the integrating circuits 13, 16, by using a value in proportion to the measured amplitude. The weighted signals are applied to an adding circuit 53. The circuit 53 obtains a sum of the signals from the integrating circuits 13, 16 respectively in the RAKE receivers 10, 20. Then, a combining between fingers and a combining between branches are performed.

FIG. 6 shows a signal combining apparatus in which the received signal is weighted by a value in proportion to its SN ratio. The apparatus comprises the RAKE receiver 10, the RAKE receiver 20 and the adding circuit 53. The received signal from the antenna 1 is input to the RAKE receiver 10, and the received signal from the antenna 2 is input to the RAKE receiver 20. Each of the RAKE receivers 10, 20 comprises two correlators 11, 14, two signal to noise ratio (SN ratio) measuring apparatuses 18, 19, and two integrating circuits 13, 16. In comparing FIG. 6 with FIG. 5, two SN ratio measuring apparatuses 18, 19 are used in place of two amplitude measuring apparatuses 12, 15.

In the signal combining apparatus shown in FIG. 6, the signals from the antenna branches 1, 2 are converted to base-band signals, and quantized by A/D conversion, then converted to digital signals. These digital signals are input to the RAKE receiver 10, 20 respectively. In each of the RAKE receivers 10 and 20, a despreading of the input signal is performed by each of the correlators 11, 14 by using a signal sequence which is used for the spread spectrum. Each SN ratio of output signals from the correlators 11, 14 is measured by each of the SN ratio measuring apparatuses 12, 15. Each output signal from the correlators 11, 14 is weighted in each of the circuits 13, 16 by using a value in proportion to the measured SN ratio. The weighted signals are input to the adding circuit 53. The adding circuit 53 obtains a sum of the signals from the circuits 13, 16 respectively in the RAKE receivers 10, 20. Then, the combining between fingers and the combining between branches are performed.

In the combining method (1) using the weight in proportion to the received signal amplitude, a required circuit scale of the signal combining apparatus is small, because the signal combining can be performed only by measuring an instantaneous value of the signal power in the amplitude measuring apparatuses 12, 15. However, because the power of the interference signal included within the received signal from the antenna 1 is different from the power of the interference signal included within the received signal from the antenna 2 as mentioned above, if the combining method is applied to the communication system shown in FIG. 4, it is impossible to obtain the maximum SN ratio of the combined signal in the signal combining apparatus shown in FIG. 5. Then, a characteristic of the signal combining becomes worse.

On the other hand, it is possible for SN ratio of the combined signal to become the maximum in the signal combining apparatus shown in FIG. 6, because the signal combining is performed by using the weight in proportion to SN ratio of the received signal.

However, for measuring SN ratio, the apparatuses 18, 19 are required to measure a variance or dispersion of a noise in the received signal. Further, for measuring the variance of the noise, a long-time measurement and an average process of the measured values are required.

Therefore, in the signal combining apparatus shown in FIG. 6, a hardware scale such as a memory amount in the SN ratio measuring apparatuses 18, 19 becomes larger than the amplitude measuring apparatuses 12, 15.

SUMMARY OF THE INVENTION

An object of the present invention is to provide a signal combining method and a signal combining apparatus, each of which enables reduction of the hardware scale such as the memory amount, in comparison with the circuit which uses the weight in proportion to the SN ratio.

In a preferred embodiment, the present invention is directed to a method for combining signals by combining a RAKE receiver method and another diversity technique in a communication system which uses a spread spectrum, said signal combining method comprising steps of:

performing a combining of received waves of RAKE fingers by using a weight value which is based on an amplitude of a received signal; and performing a combining between branches by using a weight value which is based on an inverse number of a sum of an interference power and a background-noise power in a received wave.

Further, the present invention is directed to an apparatus for combining signals in communication system which uses spread spectrum, said apparatus comprising:

at least two or more antenna branches;

plural RAKE receivers each of which combines received waves by using a weight value which is based on an amplitude of the received wave, wherein the number of the RAKE receivers is the same number of the antenna branches;

an apparatus which measures a sum of an interference and a background-noise power in an output signal from each RAKE receiver; and a branch combiner which multiplies the output signal from each RAKE receiver by an inverse number of said measured sum, and which sums the value obtained by said multiplication.

These and other objects of the present application will become more readily apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings which are given by way of illustration only and wherein.

DESCRIPTION OF THE PREFERRED EMBODIMENT

Figure 1:
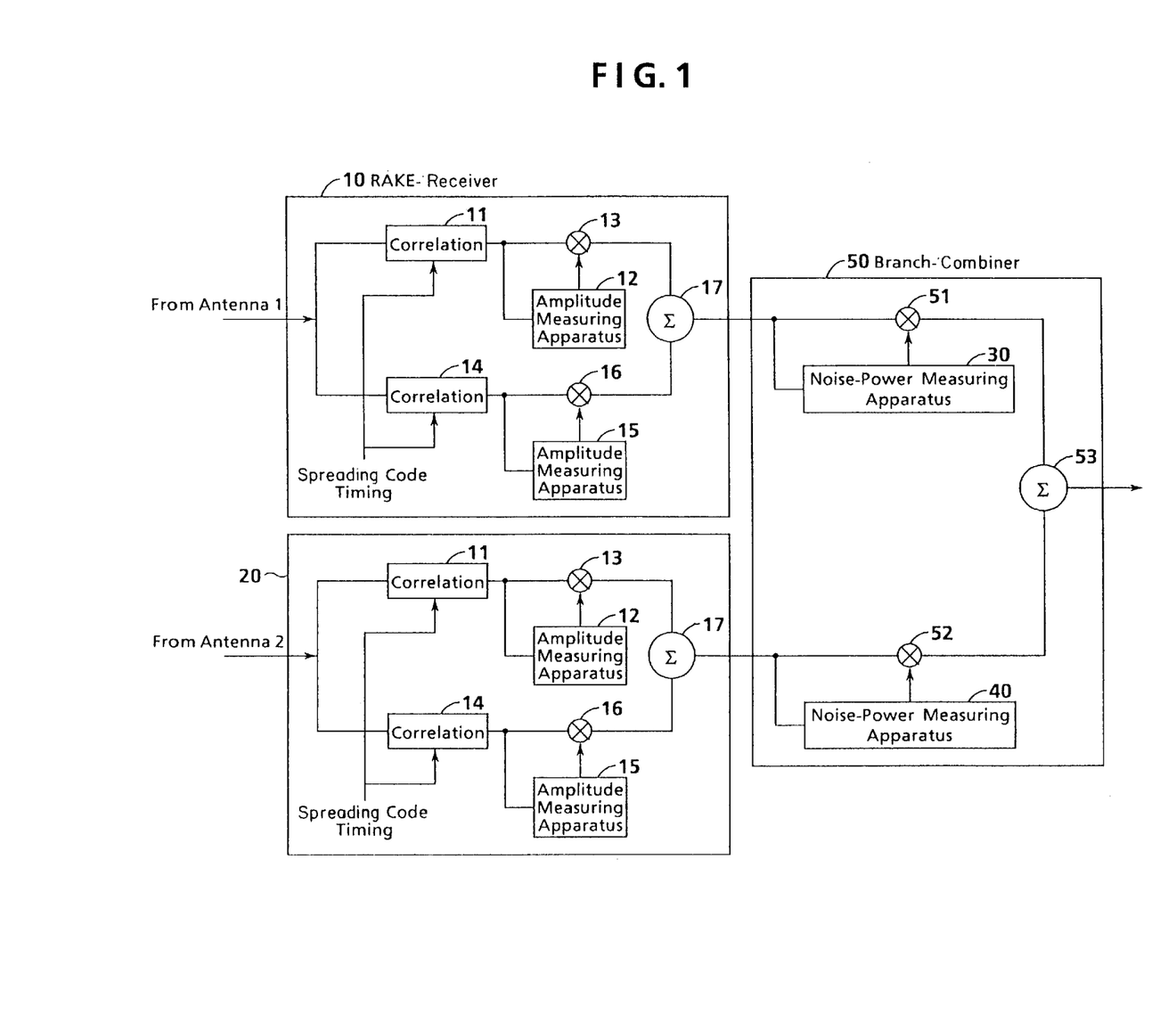
FIG. 1 shows an example of a configuration of an apparatus for combining signals.
Figure 2:
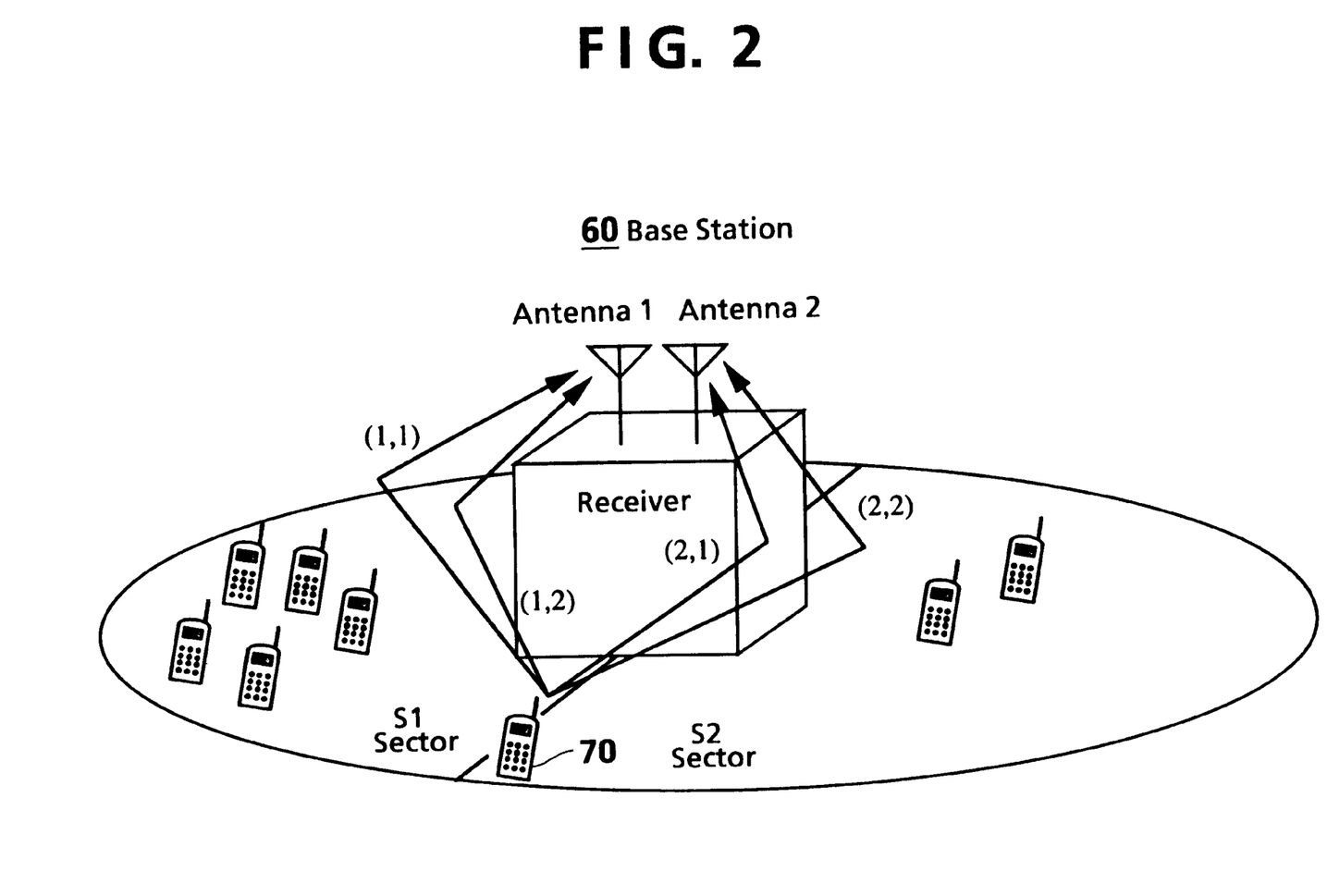
FIG. 2 shows an example of a communication system using two sector antennas for sending and receiving signals.
Figure 3:
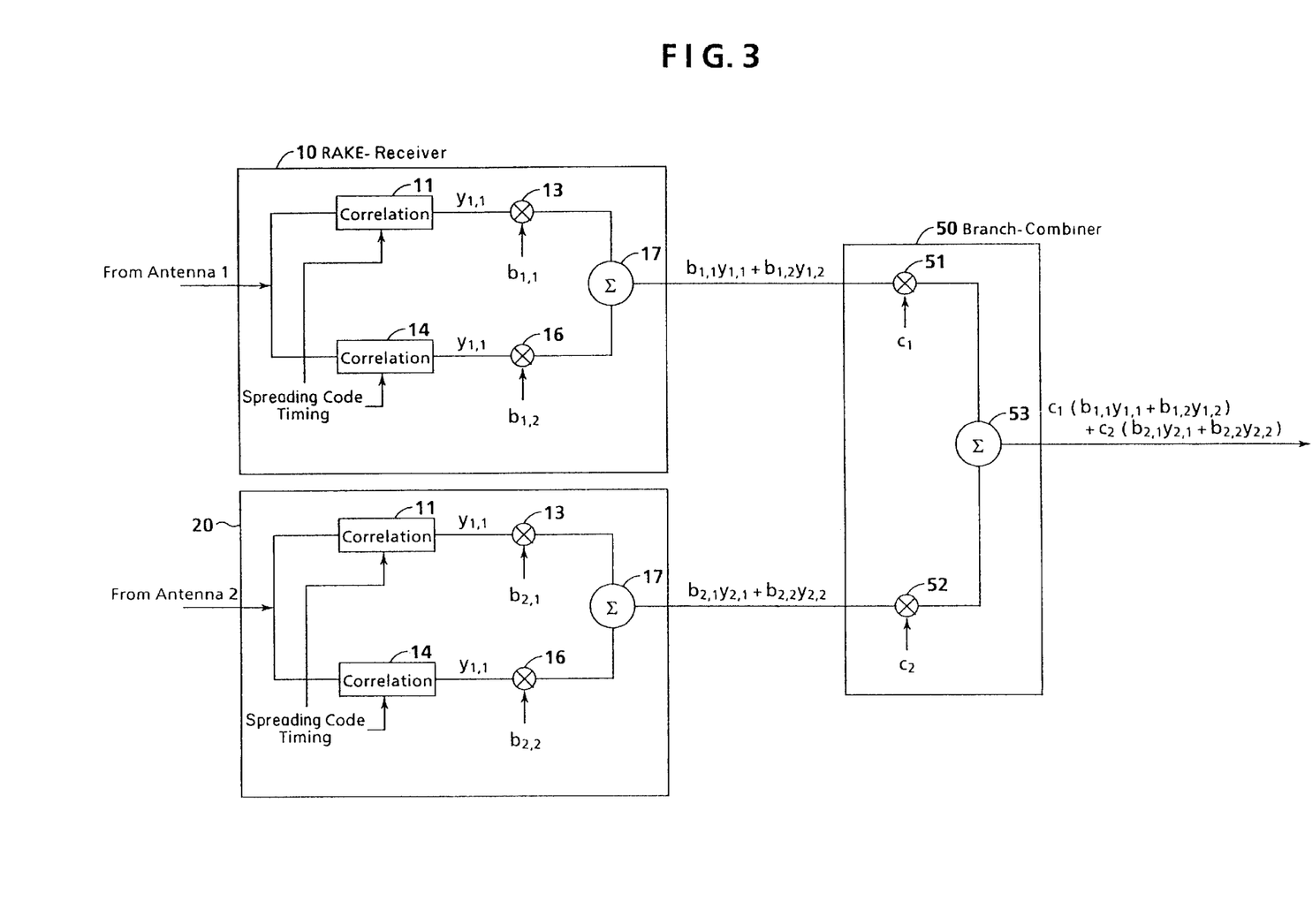
FIG. 3 shows, to explain a principle of the present invention, an example of an apparatus for performing the RAKE receiver and the branch combining.

Referring to FIGS. 1 to 3, the present invention will be explained.

FIG. 1 shows, as an embodiment of the present invention, a configuration of a signal combining apparatus under the diversity detection in the communication system using the spread spectrum.

The signal combining apparatus shown in FIG. 1 comprises two antennas 1, 2 as plural antenna branches, two RAKE receivers 10, 20 which are the same number as the antenna branches, two noise-power measuring apparatuses 30, 40 which are the same number as the antenna branches, and a combiner 50 which combines signals between branches.

Each of RAKE receivers 10, 20 weights a received signal based on its amplitude, and each of RAKE receivers 10, 20 has plural RAKE fingers. Further, in this embodiment, each of RAKE receivers 10, 20 includes two correlators 11, 14, two amplitude measuring apparatuses 12, 15, two integrating circuits 13, 16 and an adding circuit 17. One RAKE finger comprises the correlator 11, the amplitude measuring apparatus 12 and the integrating circuit 13. Another RAKE finger comprises the correlator 14, the amplitude measuring apparatus 15 and the integrating circuit 16.

In the signal combining apparatus shown in FIG. 1, signals from antenna branches 1, 2 are converted to baseband signals, quantized by A/D converter, and then converted to digital signals. These digital signals are input to the RAKE receivers 10, 20 respectively.

In each of the RAKE receivers 10, 20, despreading of the input signal is performed, by each of the correlation apparatuses 11, 14, by using a signal sequence which is used for the spread spectrum. Each amplitude of output signals from the correlators 11, 14 is measured by each of the amplitude measuring apparatuses 12, 15. Each output signal from the correlators 11, 14 is weighted in each of the integrating circuits 13, 16 by using a value in proportion to the measured amplitude. The weighted signals from the circuits 13, 16 are input to the adding circuit 17. The circuit 17 obtains a sum of the weighted signals from the integrating circuits 13, 16 respectively in the RAKE receivers 10, 20. Then, the combining between two fingers is performed respectively in each of the RAKE receivers 10, 20.

The noise-power measuring apparatus 30 measures a sum of an interference power and a background-noise power in the output signal from the RAKE receiver 10, and the noise-power measuring apparatus 40 measures a sum of an interference power and a background-noise power in the output signal from the RAKE receiver 20.

The branch combiner 50 comprises plural integrating circuits 51, 52 and an adding circuit 53. The circuit 51 multiples the output signal from the RAKE receiver 10 by an inverse of the sum measured by the noise-power measuring apparatus 30. The circuit 52 multiples the output signal from the RAKE receiver 20 by an inverse of the sum measured by the noise-power measuring apparatus 40. The circuit 53 adds a value obtained by the circuit 51 to a value obtained by the circuit 52, and then the signal combining between the branches is performed by the circuit 53.

As mentioned above, if a plurality of the interference power in the plural paths received by each antenna are equal to each other in the case that a plurality of the interference power in two antennas 1, 2 are different from each other, it is possible for the SN ratio to become the maximum after combining, because the RAKE combining of each received signal is performed by using, as a weight, the amplitude of the received signal, and the combining between the branches is performed by using, as a weight, the inverse of the sum of the interference power and the background-noise power. Generally, the plurality of the interference power in the plural paths received by one antenna are equal to each other. Further, it is possible to reduce the hardware scale rather than the prior circuit which uses the weight based on the SN ratio of the received signal.

While two noise-power measuring apparatuses 30, 40 are included in the branch combiner 50 in the signal combining apparatus shown in FIG. 1, it is possible to separate two noise-power measuring apparatuses 30, 40 from the branch combiner 50.

A principle of the present invention will be explained referring to FIGS. 2, 3. As an example, it is considered to apply the present invention to a mobile communication system using the spread spectrum. In the mobile communication system, two or more antenna systems are used for receiving.

FIG. 2 shows the mobile communication system using two sector antennas 1, 2. In FIG. 2, a base station 60 intends to receive a signal from a mobile station 70 which exists near a boundary between two sectors S1, S2. The antenna 1, of which antenna number ant# is 1, receives a signal from the sector S1. The antenna 2, of which antenna number ant# is 2, receives a signal from the sector S2. As a result, the signal from the mobile station 70 is received by the two antenna branches 1, 2 through several paths because of the direct wave and the reflected wave.

In FIG. 2. it is assumed that two paths exist for each of antenna branches 1, 2, so that four paths exist in total. A mark ant# (=1, 2) denotes an antenna number, and a mark path# (=1, 2) denotes a path number in each antenna. Then, a mark [ant#, path#] represents four paths based on a combination of the antenna number ant# and the path number path#. In FIG. 2, there are four paths [1, 1], [1, 2], [2, 1] and [2, 2].

A received signal of each path is sent to the receiver in the base station 60, via antennas 1, 2. It is assumed that the number of users in the sector S1 is different from the number of users in the sector 82. Therefore, a variance of an interference-power in one antenna branch is different from a variance of an interference-power in another antenna branch.

The signal, which was input to the receiver from each antenna, is converted to a base-band signal in frequency by a converter (not shown), and given to an A/D converter (not shown). The signal is quantized and converted to a digital signal by the A/D converter. The digital signal is input to the RAKE receiver, then the RAKE combining is performed.

Further, an output of each RAKE receiver is input to the branch receiver, then the signal combining between branches is performed.

FIG. 3 shows an example of the signal combining apparatus which performs the RAKE combining in general and the signal combining between branches. In FIG. 3, the numerals 10 and 20 denote the RAKE receiver, 11 and 14 denote the correlators, 13 and 16 denote the integrating circuits, 17 denotes the adding circuit, 50 denotes the combiner between branches, 51 and 52 denote the integrating circuits. In each finger of the RAKE receiver 10, 20, the despreading of the input signal is performed by using the signal sequence which is used for the spread spectrum. For example, the despreading is performed, in the correlators 11, 14, by using a spreading code timing which is detected by a synchronous circuit (not shown).

By using the antenna number ant# and the path number path#, a mark $y_{ant\#,\ path\#}$ (ant#=1, 2, path#=1, 2) denotes the despreaded signal. In this embodiment, the correlator 11 output a signal $y_{ant\#,\ 1}$ (ant#=1 or 2) and the correlator 14 output a signal $y_{ant\#,\ 2}$ (ant#=1 or 2) because of assuming two paths in each antenna.

Further, by using the antenna number ant# and the path number path#, a mark $b_{ant\#,\ path\#}$ (ant#=1, 2, path#=1, 2) denotes a weight.

The circuit 13 multiplies the signal $y_{ant\#,\ 1}$ (ant#=1 or 2) from the correlator apparatus 11 by the weight $b_{ant\#,\ 1}$ (ant#=1 or 2), then the product $b_{ant\#,\ 1} y_{ant\#,\ 1}$ is obtained. The circuit 16 multiplies the signal $y_{ant\#,\ 2}$ (ant#=1 or 2) from the correlator 14 by the weight $b_{ant\#,\ 2}$ (ant#=1 or 2), then, the product $b_{ant\#,\ 2} y_{ant\#,\ 2}$ is obtained. The circuit 17 in the RAKE synthesizer 10 adds up the product $b_{1,\ 1} y_{1,\ 1}$ and the product $b_{1,\ 2} y_{1,\ 2}$. The circuit 17 in the RAKE receiver 20 adds up the product $b_{2,\ 1} y_{2,\ 1}$ and the product $b_{2,\ 2} y_{2,\ 2}$. As the result, the output from each of a RAKE receivers 10, 20 is represented by equation 1.

$$\text{Output} = b_{ant\#,\ 1} y_{ant\#,\ 1} + b_{ant\#,\ 2} y_{ant\#,\ 2} \quad \text{[Equation 1]}$$

(ant#=1, 2)

Inside the branch combiner 50, each of the circuits 51, 52 multiplies each output of the RAKE receivers 10, 20 by a weight $c_{ant\#}$ (ant#=1, 2). Namely, the circuit 51 multiplies the signal $b_{1,\ 1} y_{1,\ 1} + b_{1,\ 2} y_{1,\ 2}$ from the RAKE receiver 10 by the weight $c_1$, then the product $c_1(b_{1,\ 1} y_{1,\ 1} + b_{1,\ 2} y_{1,\ 2})$ is obtained as one branch output. The circuit 52 multiplies the signal $b_{2,\ 1} y_{2,\ 1} + b_{2,\ 2} y_{2,\ 2}$ from the RAKE receiver 20 by the weight $c_2$, then the product $c_2(b_{2,\ 1} y_{2,\ 1} + b_{2,\ 2} y_{2,\ 2})$ is obtained as another branch output. The circuit 53 adds up the product $c_1(b_{1,\ 1} y_{1,\ 1} + b_{1,\ 2} y_{1,\ 2})$ and the product $c_2(b_{2,\ 1} y_{2,\ 1} + b_{2,\ 2} y_{2,\ 2})$, then a sum of two branch outputs is obtained. As the result, the output from branch combiner 50 is represented by equation 2.

$$\text{Output} = c_1(b_{1,\ 1} y_{1,\ 1} + b_{1,\ 2} y_{1,\ 2}) + c_2(b_{2,\ 1} y_{2,\ 1} + b_{2,\ 2} y_{2,\ 2}) \quad \text{[Equation 2]}$$

Obtaining a posterior probability P in the case that a certain signal x has been transmitted from the mobile station 70 will be explained. Equation 3 represents an output $y_{ant\#,\ path\#}$ (ant#=1, 2, path#=1, 2) from the correlators 11, 14 in each of the RAKE receivers 10, 20, wherein a mark $a_{ant\#,\ path\#}$ denotes an amplitude and an phase of the received signal by the antenna 1, and a mark $n_{ant\#,\ path\#}$ denotes a received noise.

$$y_{ant\#,\ path\#} = a_{ant\#,\ path\#} x + n_{ant\#,\ path\#} \quad \text{[Equation 3]}$$

When it is assumed that the noise component $n_{ant\#,\ path\#}$ complies with the gaussian distribution and the noise component $n_{ant\#, path\#}$ has no correlation between the antenna branches, equation 4 on the noise component $n_{ant\#, path\#}$ is obtained, wherein $N_{ant\#}$ denotes the variance of the noise.

$$P=[1/(4\pi^2 N_1 N_2)]\exp[-(|n_{1,1}|^2+|n_{1,2}|^2)/(2N_1)-(|n_{2,1}|^2+|n_{2,2}|^2)/(2N_2)] \quad \text{[Equation 4]}$$

A joint posterior probability P of the signals $y_{1,1}$, $y_{1,2}$, $y_{2,1}$ and $y_{2,2}$ is obtained by substituting equation 1 for equation 4. Equation 5 indicates the joint posterior probability P.

$$P=[1/(4\pi^2 N_1 N_2)]\exp[-(|y_{1,1}-a_{1,1}x|^2+|y_{1,2}-a_{1,2}x|^2)/(2N_1)-(|y_{2,1}-a_{2,1}x|^2+|y_{2,2}-a_{2,2}x|^2)/(2N_2)] \quad \text{[Equation 5]}$$

Thus, a value, which maximizes the joint posterior probability obtained from the received signals, is judged as the symbol transmitted from the mobile station 70.

A term which includes x as a parameter, in equation 5, is one indicated by equation 6.

$$\text{Term including } x = Re[\{(a^*_{1,1}y_{1,1}+a^*_{1,2}y_{1,2})/(N_1)+(a^*_{2,1}y_{2,1}+a^*_{2,2}y_{2,2})/(N_2)\}x^*] \quad \text{[Equation 6]}$$

If the parameter is only x, the joint posterior probability represented by equation 6 becomes maximum when the value x becomes maximum. Therefore, it is possible to judge that the value x, which maximizes equation 6, has the most probability as the transmitted symbol.

As a result, the transmitted symbol is judged by steps of:
obtaining the term regarding x of equation 6;
obtaining the product of the obtained term and each of all values which have a probability as the transmitted symbol; and
obtaining the maximum product.

The term regarding x of equation 6 is necessary for the judgement of the transmitted symbol.

By comparing the term regarding x of equation 6 with equation 2 which represents the received signal finally obtained from the combiner 50 between the branches, it is possible to judge the most likelihood transmitted symbol by using values indicated equation 7 as the weight $b_{ant\#, path\#}$ and the weight $c_{ant\#}$.

$$b_{1,1}=a^*_{1,1}$$
$$b_{1,2}=a^*_{1,2}$$
$$b_{2,1}=a^*_{2,1}$$
$$b_{2,2}=a^*_{2,2}$$
$$c_1=1/N_1$$
$$c_2=1/N_2 \quad \text{[Equation 7]}$$

As a result, in the signal combining apparatus shown in FIG. 1, it is possible to judge the most likely transmitted symbol, in spite of the fading, by steps of:

measuring the amplitude $a^*_{ant\#, path\#}$ of the received signal by the amplitude measuring apparatuses 12, 15;
performing the RAKE combining by using the measured amplitude $a^*_{ant\#, path\#}$ as the weight;
measuring the noise-power by the noise power measuring apparatuses 30, 40; and
performing the branch combining by using the variance $N^*_{ant\#}$ of the received noise as the weight.

According to the present invention, it is possible to improve the characteristics in the reception of the signal with fading, by using the space diversity and the RAKE receiver. Specially, in the case that the variances of the noise or the interference signal are different each other in between the antennas, it is possible to improve the characteristics over the prior art, which uses only the weight in proportion to the amplitude of the received signal. Further, it is possible to reduce the hardware scale of the receiver over the prior art, which uses the weight based on the SN ratio of each received signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for combining signals by combining a RAKE combining method and another diversity method in a communication system which uses a spread spectrum, said signal combining method comprising steps of:

combining received signals of RAKE fingers using a weight value which is based on an amplitude of a received signal; and combining signals received between diversity branches by using a weight value which is based on an inverse of a sum of an interference power and a background-noise power in a received signal.

2. An apparatus for combining signals in a communication system which uses a spread spectrum, said apparatus comprising:

at least two antenna branches;

at least two RAKE receivers, each of which combines received signals using a weight value which is based on an amplitude of the received signal, wherein the number of the RAKE receivers is equal to the number of the antenna branches;

an apparatus which measures a sum of an interference power and a background-noise power in an output signal received from each RAKE receiver; and a branch combiner which multiplies the output signal from each RAKE receiver by an inverse of said measured sum, and which sums the values obtained by said multiplication.

* * * * *